US006934513B2

(12) United States Patent
Brillon

(10) Patent No.: US 6,934,513 B2
(45) Date of Patent: Aug. 23, 2005

(54) PROCESS AND DEVICE FOR ISOTROPIC COMMUNICATION BETWEEN A VEHICLE AND A TAG

(75) Inventor: Alain Brillon, Villeneuve Tolosane (FR)

(73) Assignee: Siemens VDO Automotive, Toulouse Cedex (FR)

( * ) Notice: Subject to any disclaimer, the term of this patent is extended or adjusted under 35 U.S.C. 154(b) by 492 days.

(21) Appl. No.: 10/261,442

(22) Filed: Oct. 2, 2002

(65) Prior Publication Data

US 2003/0100284 A1 May 29, 2003

(30) Foreign Application Priority Data

Nov. 27, 2001 (FR) ............................................ 01 15316

(51) Int. Cl.[7] ............................ H04B 5/00; H04B 1/06; H04Q 9/00; H02G 3/00

(52) U.S. Cl. ........................ 455/41.2; 455/99; 455/345; 455/354; 340/5.61; 340/5.72; 307/10.1

(58) Field of Search .............................. 455/41.1, 41.2, 455/41.3, 99, 272, 345, 352, 354; 307/8.1, 10.1, 10.3; 340/5.61, 5.72, 539.1

(56) References Cited

U.S. PATENT DOCUMENTS 6,100,603 A 8/2000 Gold
6,289,209 B1 9/2001 Wood, Jr.
6,522,027 B1 * 2/2003 Morillon et al. ........... 307/10.3
6,522,241 B1 * 2/2003 Baudard .................... 340/5.61

FOREIGN PATENT DOCUMENTS

WO 01/37238 5/2001

* cited by examiner

*Primary Examiner*—Nguyen T. Vo
(74) *Attorney, Agent, or Firm*—Young & Thompson

(57) ABSTRACT

The process relates to communication between a mobile receiver fitted with at least two antennas of which one antenna is less sensitive, an internal transmitter and an external transmitter respectively inside and outside a vehicle. It comprises a step of reception (220), by the mobile receiver, of signals transmitted by the internal and external transmitters; a step of amplitude compensation (230) of signals emanating from at least one of the antennas for at least the signals originating from the internal transmitter, in such a way that the compensated amplitudes correspond to sensitivities which are identical for all the antennas; a decision step regarding processing (260, 270) of the signals received from the internal and external transmitters, in the course of which the processing of the signals originating from the internal transmitter is decided on as a function of the compensated amplitudes and in the course of which it is decided to process the signals originating from the external transmitter, independently of the compensated amplitudes; and a step of processing (280) the signals for which it has been decided to perform a processing in course of decision step.

19 Claims, 2 Drawing Sheets

PROCESS AND DEVICE FOR ISOTROPIC COMMUNICATION BETWEEN A VEHICLE AND A TAG

FIELD OF THE INVENTION

The present invention relates to a process and a device for isotropic communication between a vehicle and a tag. It applies, in particular, to communication in a so-called "hands free" vehicle control system.

BACKGROUND OF THE INVENTION

In such a hands free systems, a tag carried by the user, for example in a pocket of an item of clothing, detects a magnetic field emitted by magnetic antennas arranged inside or outside the vehicle and transmits electromagnetic waves in response, for example at radio frequency, allowing the identification of the tag. To start the engine of the vehicle, the tag must be inside the vehicle but in any position and along any direction. The tag is fitted with three antennas, oriented in a pairwise orthogonal manner. Owing to the flatness of the tag, it is not possible to arrange three identical antennas in the three relevant orthogonal directions. Two ferrite core antennas are arranged, orthogonally, in the plane of the tag. Either a very short (so that its length fits into the thickness of the tag) ferrite core antenna, or an air core antenna is arranged in the direction perpendicular to the plane of the tag. In all cases, the intrinsic sensitivities of the antennas are different.

To make an isotropic tag, that is to say one which interacts with the vehicle while exhibiting the same sensitivity whatever the orientation of the tag, it is known to reduce, at the level of the antennas, the sensitivity of the most sensitive antennas so as to align them with the sensitivity of the least sensitive antenna. These arrangements have the drawback that, during use of the tag outside the vehicle, for which use isotropy is not required, all the antennas exhibit low sensitivity, equal to the lowest intrinsic sensitivity of the three relevant antennas. The range of the tag is then needlessly reduced on account of the implementation of the arrangements indicated hereinabove.

SUMMARY OF THE INVENTION

The present invention aims to remedy these drawbacks by proposing a communication process and device, by virtue of which the communication is isotropic when the tag is inside the vehicle but exhibits a maximum range when the tag is outside the vehicle.

According to a first aspect, the present invention is aimed at a process for communicating between a mobile receiver fitted with at least two antennas of different sensitivities, an internal transmitter and an external transmitter respectively inside and outside a vehicle, characterized in that it comprises:

- a step of reception, by said mobile receiver, of signals transmitted by said internal and/or external transmitters,
- a step of amplitude compensation of signals emanating from at least one of said antennas for at least the signals originating from the internal transmitter, in such a way that the compensated amplitudes correspond to sensitivities which are identical for all said antennas,
- a decision step regarding processing of the signals received from the internal and external transmitters, in the course of which the processing of the signals originating from the internal transmitter is decided on as a function of the compensated amplitudes and in the course of which it is decided to process the signals originating from the external transmitter, independently of the compensated amplitudes, and
- a step of processing the signals for which it has been decided to perform a processing in the course of the decision step.

Thus, the sensitivity of the various antennas is no longer compensated for at the level of the intrinsic sensitivity of the antennas, but on the contrary, downstream of the reception of the signals by the various antennas of the tag.

According to particular characteristics, the process as set forth hereinabove comprises a step of identification of the transmitter, internal or external, from which the signals received originate, as a function of the information carried by said signals received. By virtue of these arrangements, the signals transmitted by the internal and external transmitters can be received by the same antennas, their identification being effected as a function of the information which they carry.

According to particular characteristics of the process as set forth hereinabove, in the course of the decision step, it is decided not to process the signals originating from the internal transmitter when a sum of the compensated amplitudes received by said antennas is less than a predetermined value.

The decision step thus simulates the antennas' sensitivity compensation, by determining whether the signals received would have been received by antennas aligned with the least sensitive antenna.

According to particular characteristics of the process as set forth hereinabove, said sum of the compensated amplitudes is a vector sum. By virtue of these arrangements, the vector sum is independent of the orientation of the mobile transmitter.

According to particular characteristics, the process as set forth hereinabove comprises a step of addition of the signals emanating from the antennas and a step of digitization of said sum, the processing step being performed on the digitized signal emanating from the step of digitization of said sum.

According to particular characteristics, a first step of digitization is performed on a signal originating from each antenna with a low digitization threshold, a step of transmitter identification and a second step of digitization of the following signal originating from said antenna are performed with a higher threshold than the low threshold if the transmitter identified is the internal transmitter and if at the same time said antenna is not the least sensitive antenna.

According to particular characteristics, the process as set forth hereinabove comprises, for at least one antenna other than the least sensitive antenna, a step of digitization with at least two digitization thresholds, providing a nonbinary signal, a step of identification of the transmitter as a function of the digitized signal and a step of binarization of the nonbinary signal with a digital threshold which depends on the transmitter identified.

A second aspect of the present invention is aimed at a device for communicating between a mobile receiver fitted with at least two antennas of different sensitivities and an internal transmitter and an external transmitter respectively inside and outside a vehicle, characterized in that it comprises:

- a means of reception, by said mobile receiver, of signals transmitted by said internal and/or external transmitters, a means of amplitude compensation of signals emanating from at least one of said antennas for at least the signals originating from the internal transmitter, in such a way that the compensated amplitudes correspond to sensitivities which are identical for all said antennas, a decision means regarding processing of the signals received from the internal and external transmitters, which is suitable for deciding on the processing of the signals originating from the internal transmitter as a function of the compensated amplitudes and for deciding to process the signals originating from the external transmitter, independently of the compensated amplitudes, and a means of processing the signals for which the decision means has decided to perform a processing.

BRIEF DESCRIPTION OF THE DRAWINGS

Other advantages, aims and characteristics of the present invention will emerge from the description which follows, given in conjunction with the appended drawing in which.

DETAILED DESCRIPTION OF THE INVENTION

Figure 1:
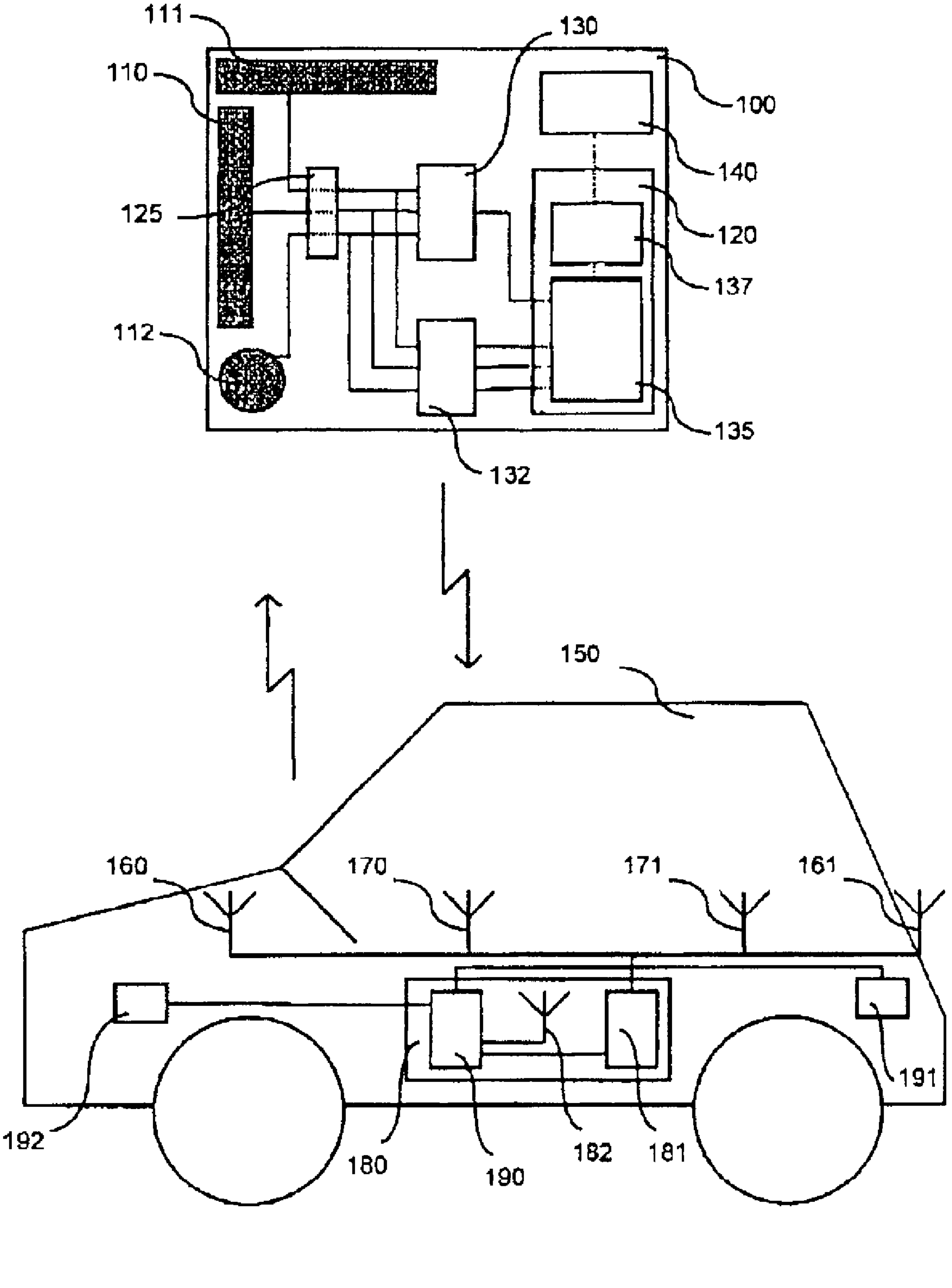
FIG. 1 represents a device for isotropic communication according to a first embodiment of the present invention.

FIG. 1 depicts a vehicle 150 comprising external antennas outside the passenger compartment, 160 and 161, internal antennas inside the passenger compartment 170 and 171, and an electronic circuit 180.

The electronic circuit 180 of the vehicle 150 is linked to the antennas 160, 161, 170 and 171. The electronic circuit 180 comprises an antenna 182 for receiving radio frequency signals and a circuit for splitting signals 181 transmitted by the antennas 160, 161, 170 and 171. Specifically, the internal antennas 170 and 171 transmit magnetic signals which are different from the magnetic signals transmitted by the external antennas. For example, the internal antennas 170 and 171 transmit signals comprising frame identification codes specific to the internal antennas. Likewise, the external antennas transmit coded signals specific to the external antennas. The various codes make it possible to identify which type of antenna is transmitting (internal or external).

The circuit 181 and the internal antennas 170 and 171 jointly define an internal transmitter. The circuit 181 and the external antennas 160 and 161 jointly define an external transmitter.

The electronic circuit 180 also comprises a circuit for processing RF signals 190 received by the antenna 182 and is linked to computers 191, 192 of the vehicle 150. As a function of the signals received by the antenna 182, the RF signals processing circuit 190 controls the passenger compartment computer 191 for example so that the openable panels, doors and trunks are locked/unlocked or the engine computer 192, so that the engine of the vehicle 150 starts or any other appropriate computer (not represented).

FIG. 1 also depicts a mobile receiver or tag 100 comprising two ferrite core antennas 110 and 111 and an air core antenna 112. The antennas 110, 111 and 112 are connected, by way of a circuit 125, to an addition and digitization circuit 130 itself linked to a decision circuit 135 of a microprocessor 120. The antennas 110, 111 and 112 are also linked, by way of the circuit 125, to a digitization module 132, itself linked to the decision circuit 135. The decision circuit 135 is linked to a processing circuit 137 of the microprocessor 120, itself linked to an RF radio frequency signals transmission antenna 140.

The ferrite core antennas 110 and 111 are presumed here to be more sensitive than the air core antenna 112. For example, the ferrite core antennas 110 and 111 have a sensitivity of 10 mV/nT whereas the air core antenna 112 has a sensitivity of 20 mV/nT.

The digitization module 132 performs a detection of peak amplitude for the signals received from each of the antennas and a digitization, for example on eight bits, of each of the peak amplitudes. For example, the module 132 is an analog/digital converter with three channels.

The microprocessor 125 (preamplification circuit) performs a compensation of the digital values provided by the module 132, in such a way that the compensated amplitudes correspond to the sensitivity of the antenna of lowest sensitivity, here the air core antenna 112. In the example given hereinabove, the measured amplitudes of the signals received by the ferrite core antennas 110 and 111 are divided by two, the ratio of the values 10 mV/nT and 20 mV/nT, so as to provide the compensated measured amplitudes of the signals. The microprocessor 125 performs a vector addition of the compensated peak amplitudes. It is recalled that the vector addition of three values x, y and z is equal to the square root of the sum of the squares of the values x, y and z. Finally, the microprocessor 125 performs a thresholding of the vector sum of the compensated peak amplitudes with a predetermined threshold.

The addition and digitization circuit 130 produces the sum of the signals emanating from the antennas 110, 111 and 112 then the digitization into signals with two values "0" and "1", of the sum of said signals. Note that the digitization threshold implemented can correspond to a value less than the lowest sensitivity of the least sensitive of the tags implementing the present invention so as to ensure that all the tags perform the digitization with the same digitization threshold, whatever their sensitivities.

The decision circuit 135 determines, as a function of the signals received, whether they have been transmitted by one of the internal antennas 170 or 171 or by one of the external antennas 160 or 161 and decides whether a processing should be applied to these signals, by the processing circuit 137 as a function, on the one hand of the transmission antenna and, on the other hand, of the vector sum of the compensated amplitudes. In the case where the transmission antenna is one of the external antennas 160 or 161, the decision circuit 135 sends the digitized signal provided by the circuit 130 to the processing circuit 137. In the case where the transmission antenna is one of the internal antennas 170 or 171, and if the vector sum of the compensated amplitudes is greater than the threshold applied by the microprocessor 125, the decision circuit 135 sends the digitized signal provided by the circuit 130 to the processing circuit 137. In the case where the transmission antenna is one of the internal antennas 170 or 171 and if the vector sum of the compensated amplitudes is less than the threshold applied by the microprocessor 125, the decision circuit 135 does not send the digitized signal provided by the circuit 130 to the processing circuit 137.

The processing circuit 137 performs the processing of the signals which it receives from the decision circuit 135 and sends, by way of the antenna 140, a response, in the form of a frame, to the antenna 182 of the vehicle 150, so as to control functions of the vehicle 150, for example the opening or the closing of the doors, when the tag 100 is outside the vehicle 150, or the starting of the engine of the vehicle 150, when the tag 100 is inside the vehicle 150. Note that the frames transmitted make it possible, upon their reception, to identify the tag 100.

The reception of a "1" binary signal originating from one of the internal antennas 170 or 171 is described in the table below. It is presumed here that the digitization thresholds (sensitivity) implemented by the circuit 130 and by the microprocessor 125 are both equal to 0.8.

| | Antenna 110 | Antenna 111 | Antenna 112 |
|---|---|---|---|
| Compensation rate applied | ½ | ½ | 1 |
| Case No. 1 | | | |
| Amplitudes of the peaks | 1 | 0 | 0 |
| Compensated amplitudes | ½ | 0 | 0 |
| Arithmetic sum of the signals | 1 | | |
| Vector sum of the compensated amplitudes | ½ | | |
| The processing is not performed since the compensated amplitude is less than the threshold of 0.8 | | | |
| Case No. 2 | | | |
| Amplitude of the peaks | 0 | 0 | 1 |
| Compensated amplitude | 0 | 0 | 1 |
| Arithmetic sum of the signals | 1 | | |
| Vector sum of the compensated | 1 | | |
| The processing is performed since the compensated amplitude is greater than the threshold of 0.8 | | | |

The processing is performed since the compensated amplitude is greater than the threshold of 0.8.

Note that, although the amplitude of the signal is the same for cases No. 1 and No. 2, the processing decisions are different. In accordance with the present invention, in case No. 1, it is determined that the amplitude received, after compensation, is less than a threshold value and, consequently, the signal is not processed. Conversely, in case No. 2, it is determined that the amplitude received is, after compensation, greater than the threshold value and, consequently, the signal is processed.

Thus, by virtue of the arrangements presented in conjunction with FIG. 1, the processing of the signals received from the internal antennas 170 and 171 is isotropic, as a function of the orientation of the tag 100, that is to say that the sensitivity of the whole of the processing applied to the signals originating from the internal antennas 170 and 171 is identical whatever the orientation of the tag 100. On the other hand, the processing of the signals originating from the external antennas 160 and 161 is not isotropic as a function of the orientation of the tag 100.

Note that several variants in accordance with the present invention make it possible to obtain the result indicated hereinabove.

In a variant which is not represented, the circuit 130 performs two digitizations of sums of the successive signals received by the antennas, one of the two digitizations implementing the sum of the signals received by the antennas, without compensation of their sensitivities and the other of the two digitizations implementing the sum of the signals received by the antennas, after compensation of their sensitivities. In this variant, the module 132 is dispensed with, the decision circuit 135 using the digitized signals provided by the circuit 130 to decide on the processing, or otherwise, of the signals received according to the criteria set forth hereinabove: the decision circuit 135 performs an identification of the antenna of the vehicle 150 from which the signal received by the antennas 110, 111 and/or 112 originates, by implementing the digitized signal corresponding to the sum of the signals without compensation. The decision circuit 135 selects the digitized signal corresponding to the sum of the signals with compensation, when the antenna identified is an internal antenna 170 or 171 and the digitized signal corresponding to the sum of the signals without compensation when the antenna identified is an external antenna 160 or 161. The decision circuit 135 sends the selected signal to the processing circuit 137.

In another variant, which is not represented, the circuit 130 performs a first digitization on a first signal originating from each antenna 110, 111 and 112, without sensitivity compensation. The decision circuit 135 identifies the type of antenna, internal or external, of the vehicle 150 from which the signal received originates and the decision circuit 135 controls the implementation of a compensation before the digitization of the following signal originating from the antennas 110, 111 and 112 if the antenna identified is an internal antenna 170 or 171. The compensated signal is then sent to the processing circuit 137. On the other hand, if the antenna of the vehicle from which the signal received originates is one of the external antennas 160 or 161, the digitized signal without compensation is sent to the processing circuit 137. According to this variant also, the module 132 is dispensed with.

As seen previously in conjunction with FIG. 1, the process for communication between the mobile receiver 100, an internal transmitter and an external transmitter respectively inside and outside a vehicle 150, implemented by the decision circuit 135 comprises:

- a step of reception, by the mobile receiver, of signals transmitted by said internal and/or external transmitters,
- a step of amplitude compensation of signals for the signals originating from the internal transmitter, in such a way that the compensated amplitudes correspond to sensitivities which are identical for all the receiving antennas of the mobile receiver,
- a decision step regarding processing of the signals received from the internal and external transmitters as a function of the compensated amplitudes, followed by a step of processing the signals.

Figure 2:
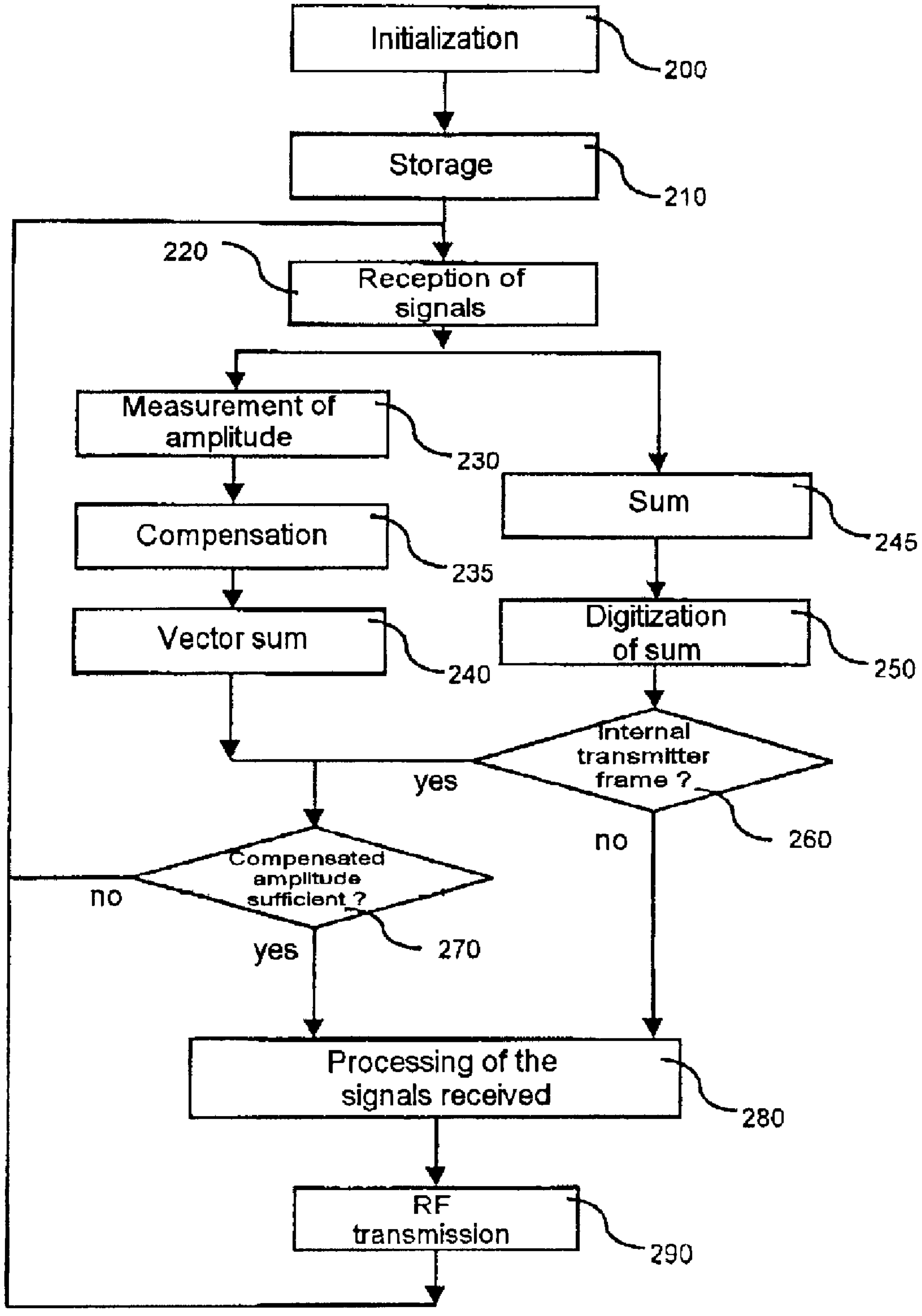
FIG. 2 represents a logic flow chart of a process for isotropic communication according to a second embodiment of the present invention.

More particularly, FIG. 2 depicts a logic flow chart implemented by the circuit illustrated in FIG. 1, in which logic flow chart, following an initialization step 200, a compensation rate storage step 210 is performed. In the course of the storage step 210, signals of like amplitude are sent to the tag 100 by virtue of gauge magnetic fields and the mean level of the amplitude of the signal received by said antenna in the course of the sending of signals is stored in correspondence with each relevant antenna. Note that this compensation rate storage is performed in the factory.

Thereafter, in the course of a reception step 220, signals originating from at least one antenna of the vehicle are received. The following steps, 230 to 240, on the one hand, and 245 to 260, on the other hand, are performed in parallel. In the course of the measurement step 230, the amplitude received by each antenna 110, 111 and 112 is measured, during the signals reception step 220. In the course of step 235, the amplitudes measured in respect of the antennas 110 to 112 are compensated by applying a compensation coefficient determined as the inverse of the value stored, for said antenna, in the course of step 210. In the course of step 240, the vector sum of the measured, compensated amplitudes is produced.

In the course of the addition step 245, the sum of the signals received by the three antennas 110, 111 and 112 is produced. In the course of the digitization step 250, the digitization of the sum determined in the course of step 245 is performed. In the course of the identification step 260, the transmission antenna, internal or external, of the vehicle 150 which has transmitted the signals received in the course of step 220 is identified as a function of the content of the frame represented by the digitized signal obtained in the course of step 250.

If the signals originate from one of the internal antennas, 170 or 171, in the course of a step 270, it is determined whether the vector sum, determined in the course of step 240, of the measured and compensated amplitudes is greater than a predetermined value, for example equal to the threshold applied in respect of the digitization performed in the course of step 250.

If it is, or if the signals originate from an external antenna 160 or 161, in the course of a processing step 280, the digitized signals obtained in the course of step 250 are processed. Then, in the course of a transmission step 290, a transmission of radio frequency signals representing a response to the signal received from the vehicle 150 is performed, toward the antenna 182 of the vehicle 150. If the result of step 270 is negative, or at the end of step 290, step 220 is repeated.

Variants similar to the variants indicated in conjunction with FIG. 1 are applicable to the process set forth in conjunction with FIG. 2.

Note that the scope of the invention is not limited to the cases where the antennas are of different types or of different dimensions, but applies, also, to cases where the spread in the technical characteristics of the components used to manufacture the tags 100 justifies compensation.

Of course, the present invention is not limited to the case presented in conjunction with FIGS. 1 and 2, but, on the contrary, covers various cases where different sensitivities are implemented. For example, two of the antennas may exhibit low sensitivity and a third high sensitivity.

LIST OF REFERENCES USED

Mobile receiver or tag 100
Ferrite core antennas 110 and 111
Air core antenna 112
Amplitude measuring circuits 120, 121 and 122
Addition and digitization circuit 130
Decision circuit 135
Compensation, vector addition and thresholding module 132
Decision circuit 135
Processing circuit 137
RF radio frequency signals transmission antenna 140
Vehicle 150
External antennas 160 and 161
Internal antennas 170 and 171
Electronic circuits 180
Radio frequency signals reception antenna 182
Signals splitting circuit 181
RF signals processing circuit 190
Passenger compartment computer 191
Engine computer 192
FIG. 2:
Initialization step 200
Compensation rate storage step 210
Reception step 220
Measurement step 230
Compensation step 235
Vector addition step 240
Addition step 245
Digitization step 250
Identification step 260
Step 270
Processing step 280
Transmission step 290

What is claimed is:

1. A process for communicating between a mobile receiver (100) fitted with at least two antennas (110, 111, 112) of different sensitivities, an internal transmitter (181, 170, 171) and an external transmitter (181, 160, 161) respectively inside and outside a vehicle (150), the process comprising:

- a step of reception (220), by said mobile receiver, of signals transmitted by said internal and/or external transmitters,
- a step of amplitude compensation (230) of signals emanating from at least one of said antennas for at least the signals originating from the internal transmitter, in such a way that the compensated amplitudes correspond to sensitivities which are identical for all said antennas,
- a decision step regarding processing (260, 270) of the signals received from the internal and external transmitters, in the course of which the processing of the signals originating from the internal transmitter is decided on as a function of the compensated amplitudes and in the course of which it is decided to process the signals originating from the external transmitter, independently of the compensated amplitudes, and
- a step of processing (280) the signals for which it has been decided to perform a processing in the course of the decision step.

2. The process as claimed in claim 1, further comprising a step of identification (260) of the transmitter, internal or external, from which the signals received originate, as a function of the information carried by said signals received.

3. The process as claimed in claim 2, wherein in the course of the decision step (260, 270), it is decided not to process the signals originating from the internal transmitter (181, 170, 171) when a sum of the compensated amplitudes received by said antennas (110, 111, 112) is less than a predetermined value.

4. The process as claimed in claim 3, wherein said sum of the compensated amplitudes is a vector sum.

5. The process as claimed in claim 3, further comprising a step of addition (240) of the signals emanating from the antennas and a step of digitization (250) of said sum, the processing step (280) being performed on the digitized signal emanating from the step of digitization of said sum.

6. The process as claimed in claim 4, further comprising a step of addition (240) of the signals emanating from the antennas and a step of digitization (250) of said sum, the processing step (280) being performed on the digitized signal emanating from the step of digitization of said sum.

7. The process as claimed in claim 2, further comprising a step of addition (240) of the signals emanating from the antennas and a step of digitization (250) of said sum, the processing step (280) being performed on the digitized signal emanating from the step of digitization of said sum.

8. The process as claimed in claim 2, wherein in the course of the decision step (260, 270), it is decided not to process the signals originating from the internal transmitter (181, 170, 171) when a sum of the compensated amplitudes received by said antennas 110, 111, 112) is less than a predetermined value.

9. The process as claimed in claim 8, wherein said sum of the compensated amplitudes is a vector sum.

10. The process as claimed in claim 9, further comprising a step of addition (240) of the signals emanating from the antennas and a step of digitization (250) of said sum, the processing step (280) being performed on the digitized signal emanating from the step of digitization of said sum.

11. The process as claimed in claim 1, further comprising a step of addition (240) of the signals emanating from the antennas and a step of digitization (250) of said sum, the processing step (280) being performed on the digitized signal emanating from the step of digitization of said sum.

12. A device for communicating between a mobile receiver (100) fitted with at least two antennas (110, 111, 112) of different sensitivities, an internal transmitter (181, 170, 171) and an external transmitter (181, 160, 161) respectively inside and outside a vehicle (150), the device comprising:

a means of reception (110, 111, 112), by said mobile receiver, of signals transmitted said internal and/or external transmitters, a means of amplitude compensation (132) of signals emanating from at least one of said antennas for at least the signals originating from the internal transmitter, in such a way that the compensated amplitudes correspond to sensitivities which are identical for all said antennas, a decision means regarding processing (135) of the signals received from the internal and external transmitters, which is suitable for deciding on the processing of the signals originating from the internal transmitter as a function of the compensated amplitudes and for deciding to process the signals originating from the external transmitter, independently of the compensated amplitudes, and a means of processing (137) the signals for which the decision means has decided to perform a processing.

13. The device as claimed in claim 12, wherein the decision means is suitable for identifying the transmitter, internal or external, from which the signals received originate, as a function of the information carried by said signals received.

14. The device as claimed in claim 13, wherein the decision means is suitable for deciding not to process the signals originating from the internal transmitter when a sum of the compensated amplitudes received by said antennas is less than a predetermined value.

15. The device as claimed in claim 14, further comprising means of addition (130) of the signals emanating from the antennas and a means of digitization (130) of said sum, the processing means processing the digitized signal provided by the means of digitization of said sum.

16. The device as claimed in claim 13, further comprising means of addition (130) of the signals emanating from the antennas and a means of digitization (130) of said sum, the processing means processing the digitized signal provided by the means of digitization of said sum.

17. The device as claimed in claim 12, wherein the decision means is suitable for deciding not to process the signals originating from the internal transmitter when a sum of the compensated amplitudes received by said antennas is less than a predetermined value.

18. The device as claimed in claim 17, further comprising means of addition (130) of the signals emanating from the antennas and a means of digitization (130) of said sum, the processing means processing the digitized signal provided by the means of digitization of said sum.

19. The device as claimed in claim 12, further comprising means of addition (130) of the signals emanating from the antennas and a means of digitization (130) of said sum, the processing means processing the digitized signal provided by the means of digitization of said sum.

* * * * *